(12) United States Patent
Miura

(10) Patent No.: US 6,964,347 B2
(45) Date of Patent: Nov. 15, 2005

(54) HANDY BOTTLE AND PROCESS FOR MANUFACTURING SAME

(75) Inventor: Masaki Miura, Yokohama (JP)

(73) Assignee: Toyo Seikan Kaisya, Ltd., Tokyo (JP)

( * ) Notice: Subject to any disclaimer, the term of this patent is extended or adjusted under 35 U.S.C. 154(b) by 0 days.

(21) Appl. No.: 10/140,960

(22) Filed: May 7, 2002

(65) Prior Publication Data

US 2003/0075521 A1 Apr. 24, 2003

(30) Foreign Application Priority Data

Sep. 28, 2001 (JP) .................................. 2001-302559

(51) Int. Cl.[7] .............................................. B65D 23/10
(52) U.S. Cl. ...................... 215/384; 215/383; 215/398; 220/675; 220/771
(58) Field of Search ................................ 215/381, 383, 215/384, 396, 398; 220/669, 675, 771

(56) References Cited

U.S. PATENT DOCUMENTS

| | | | | |
|---|---|---|---|---|
| 1,602,391 A | * | 10/1926 | Clinton ...................... | 215/384 |
| 3,225,950 A | * | 12/1965 | Fulcher et al. .............. | 215/384 |
| 4,804,097 A | * | 2/1989 | Alberghini et al. ......... | 215/384 |
| 4,805,788 A | * | 2/1989 | Akiho ......................... | 215/381 |
| 5,148,930 A | * | 9/1992 | Ota et al. .................... | 215/384 |
| 5,165,557 A | * | 11/1992 | Ota et al. .................... | 215/384 |
| 5,199,587 A | * | 4/1993 | Ota et al. .................... | 215/381 |
| 5,226,550 A | * | 7/1993 | Mikolaitis et al. .......... | 215/384 |
| 5,392,937 A | * | 2/1995 | Prevot et al. ................ | 215/400 |
| 5,407,086 A | * | 4/1995 | Ota et al. .................... | 215/383 |
| 5,472,105 A | * | 12/1995 | Krishnakumar et al. .... | 215/384 |
| 5,598,941 A | * | 2/1997 | Semersky et al. ........... | 215/384 |
| D390,114 S | * | 2/1998 | Young ......................... | D9/520 |
| D393,211 S | * | 4/1998 | Mengeu ....................... | D9/543 |
| 5,735,420 A | * | 4/1998 | Nakamaki et al. .......... | 215/373 |
| 5,758,790 A | * | 6/1998 | Ewing, Jr. ................... | 215/384 |
| D402,896 S | * | 12/1998 | Conrad ........................ | D9/543 |
| 5,908,128 A | * | 6/1999 | Krishnakumar et al. .... | 215/381 |
| 5,971,184 A | * | 10/1999 | Krishnakumar et al. .... | 215/384 |
| D426,164 S | * | 6/2000 | Gans et al. .................. | D9/541 |
| D431,470 S | * | 10/2000 | Henderson ................... | D9/520 |
| 6,161,713 A | * | 12/2000 | Krich .......................... | 215/384 |
| 6,277,321 B1 | | 8/2001 | Vailliencourt et al. ...... | 264/529 |
| 6,349,839 B1 | * | 2/2002 | Mooney ...................... | 215/384 |
| 6,375,025 B1 | * | 4/2002 | Mooney ...................... | 215/384 |
| 6,494,333 B2 | * | 12/2002 | Sasaki et al. ............... | 215/384 |
| 6,513,669 B2 | * | 2/2003 | Ozawa et al. ............... | 215/381 |
| 6,616,001 B2 | * | 9/2003 | Saito et al. .................. | 215/381 |
| 6,698,606 B2 | * | 3/2004 | Deubel et al. ............... | 215/384 |

FOREIGN PATENT DOCUMENTS

| | | | | |
|---|---|---|---|---|
| DE | 25 45 014 | | 12/1976 | |
| EP | 0 356 829 | | 3/1990 | |
| EP | 1 099 638 | | 5/2001 | |
| FR | 1397037 | | 5/1964 | |
| FR | 2528389 A1 | * | 12/1983 | ................. 215/384 |
| JP | 408276924 A | * | 10/1996 | |
| JP | 8-323845 | | 12/1996 | |
| JP | 2000-246790 | | 9/2000 | |
| JP | 2002154515 A | * | 5/2002 | ............ B65D/1/02 |
| JP | 2002154517 A | * | 5/2002 | ............ B65D/1/02 |

* cited by examiner

Primary Examiner—Sue A. Weaver
(74) Attorney, Agent, or Firm—Jordon and Hamburg LLP

(57) ABSTRACT

A handy bottle is capable of absorbing deformation strain caused by variation of capacity, is easy to lift and carry because of its recessed portions for gripping and is excellent in dropping strength and capable of not buckling while maintaining moldability and lightweight property. Typically, the handy bottle has recessed portions for gripping on both sides of a body portion thereof and a shape in diametric cross section of the recessed portions is almost bilaterally symmetrical to a line connecting deepest portions of the recessed portions and a central axis of the body portion. The process for producing the handy bottle allows movable inserts capable of molding the recessed portions for gripping to be on standby in predetermined positions and allows the movable inserts to proceed toward the deepest portions of the recessed portions for gripping in the course of blow molding.

11 Claims, 19 Drawing Sheets

FIG. 19
PRIOR ART
FIG. 20
PRIOR ART
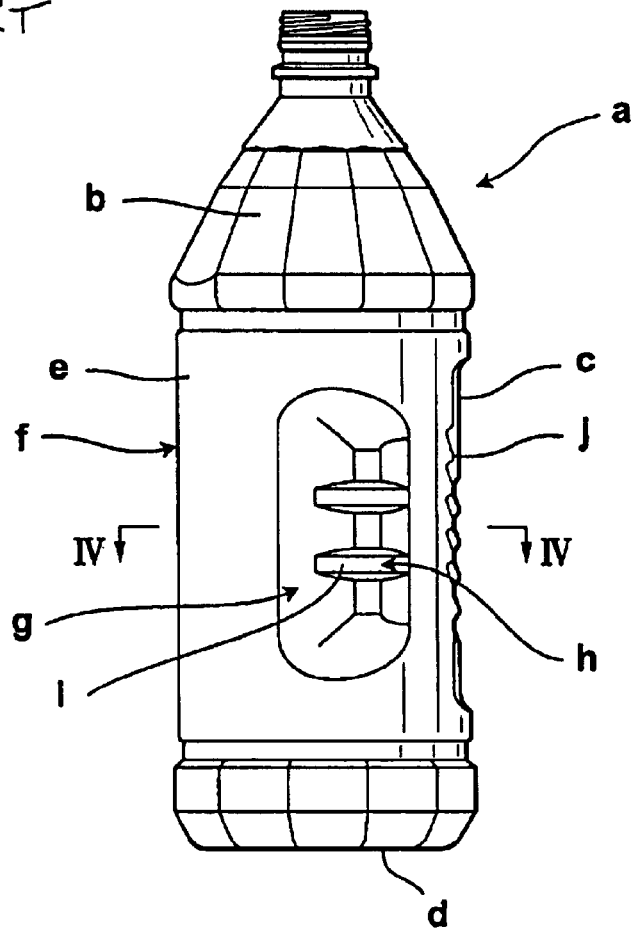
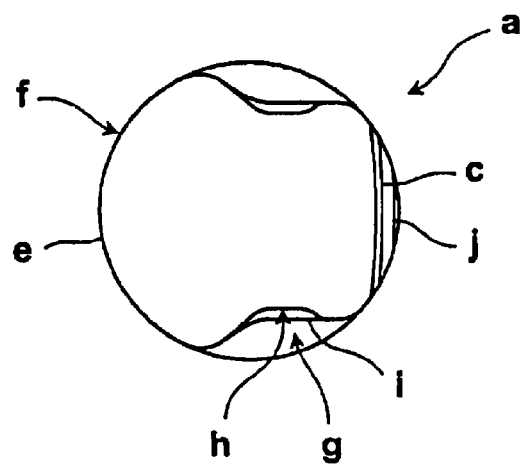

HANDY BOTTLE AND PROCESS FOR MANUFACTURING SAME

BACKGROUND OF THE INVENTION

1. Field of the Invention

The present invention relates to a handy bottle provided with a pair of recessed portions for gripping and a process for producing same. More particularly, the present invention relates to a handy bottle featured firstly in that the periphery of the recessed portions for gripping on both sides (the wording "both sides" will be explained in detail hereinafter) are surrounded with a plane portion to absorb deviation in capacity of the contents caused by expansion or shrinkage of the bottle, and secondly in that the shortest distance between the deepest portion of the recessed portions for gripping on both sides is 50% or less of the diameter of the body portion while the shape in diametrical cross section of the recessed portions for gripping is approximately bilaterally symmetrical to a straight line passing through the body axis and the deepest portion.

The present invention relates also to a process for producing a handy bottle, which is featured by involving the steps of blow molding a bottle, while previously allowing movable inserts for molding the recessed portions for gripping to be on standby in a position at 2.0~2.6 times ½ of the central diameter of a preform from the central axis of the preform, and allowing the movable inserts to proceed toward the deepest portion of the recessed portion for gripping in the course of the blow molding.

2. Description of the Prior Art

A bottle made of a synthetic resin provided with a recessed portion easy for griping, i.e. a handy bottle, finds it useful as a container for edible oils, condiments or seasonings of a relatively large volume. As the bottle is usually charged with the contents at a high temperature, an inner space of the bottle after cooling becomes more or less vacuum state. In case of a bottle provided with the recessed portions for gripping, it is naturally limited in the places where reduced pressure absorbing panel is provided, as compared with an ordinary bottle, so that deformation tends to take place in the body portion including a labeling portion. Thus, various countermeasures have been made to avoid such defect.

A handy bottle of this type has become handy by providing it with recessed portions for gripping to the body portion thereof, without using any separate foreign parts, in accordance with the request for saving cost and resource and for environmental problems. As the result, various countermeasures have been applied to avoid deterioration of strength. In such handy bottle, however, the so-called "buckling phenomenon" (a phenomenon of the recessed portions for gripping being pushed outward) tends to take place by impact at the time of dropping the bottle filled with the contents or by pressurizing the bottle at the time of checking any pinhole on manufacturing the bottle, so that too deep recessed portions for gripping cannot be molded. In case of a handy bottle devoid of such deep recessed portion, the bottle may still be easy for carrying but a considerable gripping power will be necessary instead. Thus, such handy bottle is not fully satisfactory in aspect of easiness for carrying and pouring the contents.

On consideration of the known conventional art, a technical idea of such handy bottle is known as shown in the accompanying FIGS. 19 and 20 wherein the notation a stands for a handy bottle, b for a shoulder panel, c for a back surface panel, and d for a bottom portion. In this case, any deforming power applied to the bottle is absorbed by the so-called panel effect of the panels provided in the shoulder, the back surface and the bottom portion to avoid deformation of a labeling portion.

This handy bottle a having a body portion f is circle in cross section and is inwardly recessed at the opposing two points of circle in cross section to form a vertically longer recessed portion g. A location of the two points where the bottle is inwardly recessed to form the recessed portions for gripping h is referred to herein as "both sides" of the bottle looking cylindrical in front view. The recessed portions for gripping g are provided with a plurality of reinforcing ribs h having protuberant top portions i, which extend across the recessed portion for gripping g. A gripping side (back side) of the bottle having a body portion c is provided with a plurality of reinforcing ribs j for preventing the buckling phenomenon.

As shown in the accompanying FIG. 21, a handy bottle a-1 is also known (Japanese Utility Model Publn. No. Hei. 4-20727), which has a body portion f provided on both sides thereof with opposing recessed portions c to form a gripping portion g. On the back side of the gripping portion g, a plurality of recessed reinforcing ribs h are formed which are orthogonally crossed with a central axis T of the bottle, and each of the ribs h forms a recessed portion i in the central portion thereof.

As another prior art, a handy bottle a-2 is known (Japanese Laid-open Patent Appln. No. Hei. 6-56138), which has a construction such that the bottle is recessed on both sides of a body portion f to form a pair of recessed portions for gripping c as shown in FIG. 22, and a reinforcing rib j in peripheral direction is formed from the lower part of the recessed portions for gripping c.

Also known is a bottle structure as shown in FIG. 23 wherein one side portion p of a handy bottle a-3 made of a synthetic resin where a label k is to be applied is made thicker in thickness while the other side portion m opposing to the side portion p is made thinner in thickness, the side portion m is provided with a reduced pressure-absorbing panel n capable of absorbing strain of the bottle a-3 under reduced pressure while the side portion m becomes protuberant from the side surface of the bottle a-3 to form a gripping portion o of a mountain shape in cross section and the back portion of this gripping portion acts as a reduced pressure-absorbing panel n (Japanese Utility Model Publn. No. Hei. 4-23766).

Further, a handy bottle as shown in FIG. 24 is known wherein a handy bottle a-4 having a body portion b is recessed inwardly from both sides of the body portion b to form a pair of opposing recessed portions for gripping c, a plurality of lateral ribs k are formed on the wall of a rear body portion between the pair of the recessed portion for gripping c while the recessed portion for gripping c is recessed inwardly by a rear slope l continuing from the end of the lateral rib k and a large curved surface continuing from the end of the lateral rib k to the wall of a front body portion n or recessed inwardly by a large curved surface continuing from the end of the lateral rib k to the wall of the front body portion m (Japanese Laid-open Patent Appln. No. Hei. 10-139028).

Such handy bottle is usually molded in such manner that a preform is inserted into a metal mold for blow molding which has been provided in opposing state with a pair of movable inserts capable of molding recessed portions for gripping, the preform is allowed to expand by stretching and blowing after heating the preform for softening, and when the volume becomes almost equal to 100% of the capacity of the metal mold, a pair of the movable inserts charged into the metal mold for blow molding are moved and pushed into the deepest position for forming the recessed portions for gripping thereby forming the recessed portions for gripping.

The handy bottle thus manufactured becomes thicker in thickness in the deepest portion of the recessed portion for gripping while becoming thinner in both side portions, thus making a tendency of unbalance in lateral direction. Moreover, the bottom portion becomes thicker and a heal portion just above the bottom portion becomes thinner, thus making a tendency of unbalance in vertical direction.

Consequently, the so-called buckling phenomenon takes place by impact at the time of dropping the bottle or by pressuring the bottle at the time of checking any pinhole so that too deep recessed portions for gripping cannot be molded. Even in case of a handy bottle devoid of such deep recessed portions for gripping, the bottle may still be easy for carrying but a considerable gripping power will be necessary instead. Thus, such handy bottle cannot be said to be fully satisfactory.

In consideration of such problems raised in the manufacture of handy bottles, a method for manufacturing handy bottles, which prevents the tendency of becoming thinner in both side portions, is known (Japanese Laid-open Patent Appln. No. Hei. 2-72925). According to this method, a preform is expanded by stretching or blowing after it is heated and softened whereby its volume reaches to at least 80% but not more than 100% of the capacity of a metal mold for blow molding, and at this moment a pair of movable inserts mounted to the metal mold are allowed to proceed and pushed into the deepest portion where the recessed portions for gripping is formed thereby forming the recessed portion to prevent a tendency of making both side portions thinner.

DISCLOSURE OF THE INVENTION

1. Problems to be Solved by the Invention

In case a liquid having a large variation in its volume such as an alcohol, especially whiskey of a high alcohol concentration is adopted as contents of a handy bottle a as shown in the foregoing FIGS. 19 and 20, however, it has become evident that a conventional shoulder panel b, back surface panel c and a bottom portion d can no longer absorb deformation strain caused by reduce pressure so that a phenomenon of forming recess is found in a labeling portion c.

This handy bottle a is increased in the buckling strength by reinforcing ribs d formed in the recessed portions for gripping c, thus exhibiting the technical effect that the buckling phenomenon hardly takes place. However, the recessed portions for gripping c cannot reach to the depth necessary for facilitating to lift up the bottle only by the reinforcing ribs d. Moreover, the depth is compensated with the reinforcing ribs d, thus resulting in diminishing the effect of facilitating to lift up the bottle. In addition to this effect, the shape in cross section of the recessed portions for gripping c of this handy bottle a is not bilaterally symmetrical to the straight line passing through the central axis of the bottle so that a problem of deviation in thickness (whitening due to super-stretching) tends to take place.

Furthermore, a handy bottle a-1 as shown in FIG. 21, which has a technical effect that deformation hardly take place and the bottle is easy for carrying when the recessed portions for gripping c are strongly grasped, fails to act effectively on the buckling phenomenon that is regarded as a reverse phenomenon and involves a problem due to the shape, i.e. the shape of the recessed portions for gripping c in diametrical cross section is bilaterally asymmetrical to the straight line passing through the central axis of the bottle, deviation in thickness tends to occur during molding.

The handy bottle a-2 as shown in FIG. 22 has an angle exceeding 90° in diametrical section of the recessed portion for gripping c so that the bottle affords almost no hold for fingers, and the recessed portions for gripping c only accept one or two fingers on single side so that it will be hard to lift up the bottle unless strong grasping power be applied. Thus, it is not practical if the bottle has a large capacity of, for example, 2.7 liters.

In case the handy bottle a-3 as shown in FIG. 23 is at least effective since a back portion of the grip portion c forms a reduced pressure-absorbing panel n, which can deal with variation of volume. However, this handy bottle a-3 wherein one side portion p to which a label k is attached is thicker while the other side portion m is thin, and the thin portion provided with the reduced pressure-absorbing panel n serves to deal with variation of volume is against the request for saving cost and resource, and for environmental problems. Accordingly, the use of this bottle is limited to a special purpose and the reduced pressure-absorbing panel alone is supposed to be insufficient for large variation of volume. In addition, the grip portion c is formed as a recessed portion and is positioned in the thin other side portion m so that the so-called buckling phenomenon may tae place in this structure.

The handy bottle a-4 as shown in FIG. 24 has a merit that it is well fit for fingers and can be lifted up and operated by hand and that if the recessed portions for gripping c are strongly grasped, deformation of the bottle hardly occurs and ease in carrying is warranted. However, this bottle is not effective to a reverse phenomenon, i.e. the buckling phenomenon, and its depth in the recessed portions for gripping c is not sufficient for carrying. As in the case of FIGS. 19 and 20, moreover, the shape in cross section of the recessed portions for gripping c is bilaterally asymmetrical to the straight line passing thorough the central axis of the bottle so that there may be a problem that deviation in thickness takes place at the time of molding the handy bottle a-4.

In consideration of the aforesaid conventional prior art in the aspect of a process for manufacturing bottles, it has been made manifest that a handy bottle obtained by pushing forward a pair of the movable inserts when the volume of a preform reaches at least 80% but not more than 100% of a metal mold for blow molding is more or less improved in solving the problem of deviation in thickness, but still fails to improve the tendency of deviation in thickness completely; thicker in the deepest portion of the recessed portions but thinner in both side portions.

2. SUMMARY OF THE INVENTION

Accordingly, it is an object of the present invention to provide a handy bottle that absorbs deformation strain caused by variation of volume while maintaining moldability and lightweight property, and is easy for carrying because of its recessed portions for gripping.

It is another object of the present invention to provide a handy bottle excellent in dropping strength and capable of preventing the buckling phenomenon while maintaining moldability and lightweight property, which has a deep recessed portions for gripping to keep sufficient grasping function for easy lifting up or carrying even in case a bottle of a large capacity is filled fully with contents.

It is still another object of the present invention to provide a process for producing a handy bottle excellent in dropping strength and capable of preventing the buckling phenomenon while maintaining moldability and lightweight property, which has a deep recessed portions for gripping to keep sufficient grasping function for easy lifting and carrying even in case a bottle of a large capacity is filled with contents, the process being featured by controlling distribution of deviation in thickness in lateral and vertical directions.

Other and further objects, features and advantages of the present invention will become apparent more fully from the following description.

3. Means for Solving the Problems

The present invention has been proposed to achieve the above object and is characterized by the following construction:

In accordance with the present invention, there is provided a handy bottle which comprises a bottle made of a synthetic resin having a mouth finish, a body portion, and a bottom portion and provided on both sides of the body portion thereof with recessed portions for gripping, characterized in that the recessed portions on both sides are encompassed with a plane portion.

In accordance with the present invention, there is provided the handy bottle wherein a label portion is positioned in the body portion opposite to the body portion provided on both sides with the recessed portions for gripping, and the body portion positioned between the label portion and the recessed portions for gripping on both sides is provided with vertical ribs.

In accordance with the present invention, there is provided the handy bottle wherein recessed lateral ribs extending in peripheral direction are provided in connection or adjacent to the up side end and/or down side end of the plane portion encompassing the recessed portions for gripping on both sides.

In accordance with the present invention, there is provided the handy bottle which comprises a handy bottle composed of a mouth finish, a body portion, and a bottom portion and provided on both sides of the body portion thereof with recessed portions for gripping, a minimum distance (L) between the deepest portion of the recessed portions for gripping being 50% or less of the diameter (D) of the body portion (L/D≦50%) and a shape in diametric cross section of the recessed portions being almost bilaterally symmetrical to a straight line connecting the deepest portions and the central axis of the body portion.

In accordance with the present invention, there is provided the handy bottle wherein an angle (θ1) of the recessed portions for griping is within the range from 0° to 90° in diametric cross section (0°≦θ1≦90°) and an angle (θ2) formed by the lines connecting the deepest portion in diametric cross section of the recessed portions for gripping and the central axis of the body portion is within the range from 120° to 180° (120°≦θ2≦180°).

In accordance with the present invention, there is provided the handy bottle wherein a shape of the recessed portions for gripping on both ends is horizontal in an axial direction.

In accordance with the present invention, there is provided the handy bottle wherein a shape of the recessed portions for gripping in cross section is outwardly protuberant in an axial direction.

In accordance with the present invention, there is provided the handy bottle wherein the length of the recessed portions for gripping in diametric direction is longer (C>E) in the central portion (C) than in the both ends (E).

In accordance with the present invention, there is provided the handy bottle wherein the recessed portions for gripping are provided with outwardly protuberant auxiliary ribs extending in a diametric direction thereof.

In accordance with the present invention, there is provided the handy bottle wherein the auxiliary ribs are three ribs arranged in an axial direction of the bottle at a given intervals.

In accordance with the present invention, there is provided the handy bottle wherein the mass of a bottom portion of the bottle is 12~14.5% of the total bottle mass.

In accordance with the present invention, there is provided a process for producing a handy bottle which comprises blow molding a handy bottle having a mouth finish, a body portion and a bottom portion and provided in the body portion thereof with opposing recessed portions for gripping by the aid of a metal mold, characterized in that the blow molding of the bottle is carried out on condition that a pair of movable inserts capable of forming the recessed portions for gripping are previously on standby in a location at 2.0~2.6 times ½ of the central diameter (R) of a preform from the central axis of the preform [½R×(2.0 to 2.6)], and the movable inserts are allowed to proceed toward the deepest portion of the recessed portions for gripping in the course of proceeding of blow molding thereby making the bottom portion at least thin in thickness.

In accordance with the present invention, there is provides a process for producing a handy bottle wherein the movable cores are allowed to proceed at the tine the proceeding of blow molding reaches to at least 30% but not more than 70% of the inner capacity of the handy bottle.

BRIEF DESCRIPTION OF THE DRAWINGS

The present invention can more fully be understood from the following description taken in conjunction with the accompanying drawings in which:

FIG. 19 is a side view showing an example of the conventional handy bottles.

FIG. 20 is a sectional view showing the handy bottle of FIG. 19 cut along the line IV—IV.

PREFERABLE MODE FOR CARRYING OUT THE INVENTION

In the present invention, the time element for moving the movable inserts during blow molding is critical. If the movable inserts are allowed to work when the proceeding of blow molding is not greater than 30% of the inner capacity of the handy bottle, the recessed portion for gripping, especially both side portions thereof will be inferior in moldings. Further, whitening of the moldings caused by super-stretching takes place. Moreover, expansion of the preform to the bottom part is inhibited so that the resin is short in the bottom portion to make the thickness thin.

On the other hand, if the movable inserts are allowed to work when the proceeding of blow molding is at least 70% of the inner capacity of the handy bottle, whitening of the moldings tends to take place from the deepest portion of the recessed potion for gripping to both side portions due to super-stretching. Further, both side portions tend to become thin in thickness while the bottom portion becomes thicker than the desired thickness.

The aforesaid limitation has been found on the basis of results of the inventors' repeated experiments. Above all, it is particularly preferable to allow the movable inserts to work when the proceeding of blow molding reaches to 60% (±3%) of the inner capacity of the handy bottle. Thus, distribution of thickness in lateral and vertical directions can be varied and can prevent the bottom portion becoming thick while the heal portion just above the bottom portion becoming thin by controlling the timing of allowing the movable inserts to work.

Figure 1:
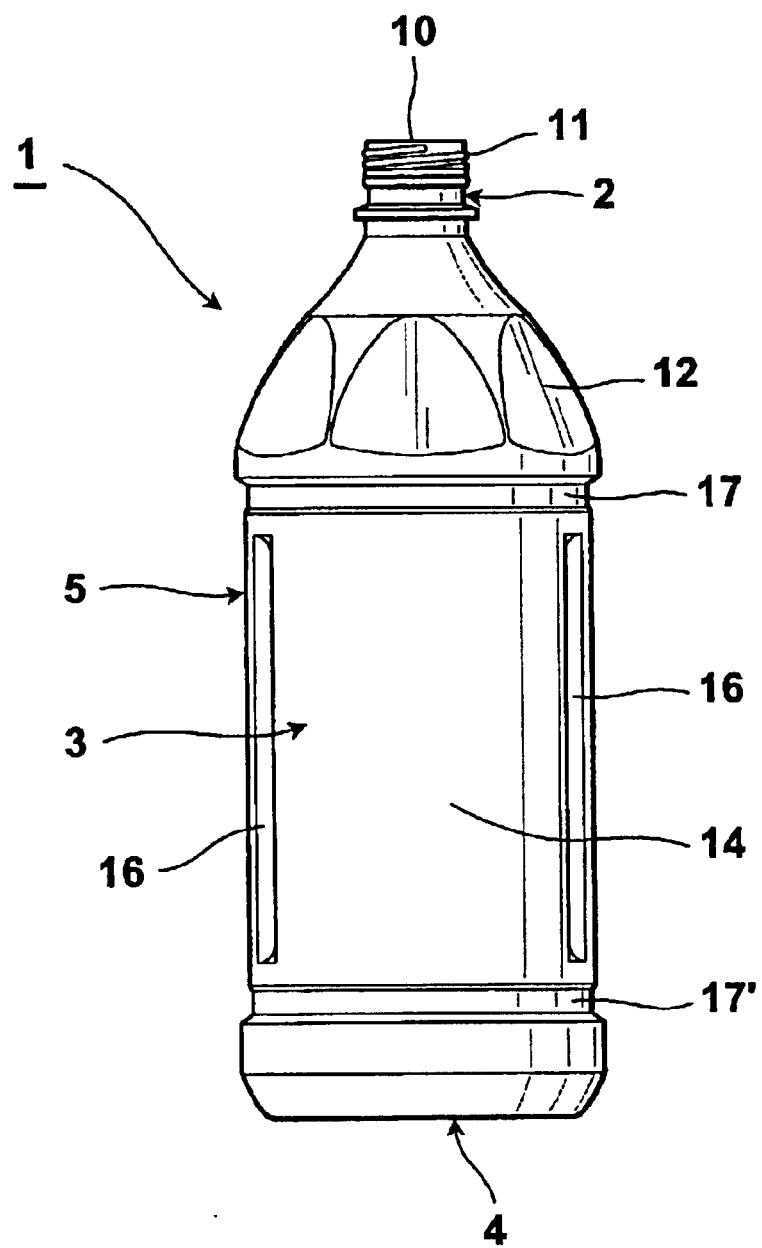
FIG. 1 is a front view showing an embodiment of the handy bottle of the present invention.

In FIG. 1 showing a front view of an embodiment of the handy bottle of the present invention, the handy bottle 1 has a mouth finish 2, a body portion 3, and a bottom portion 4. A main body 5 of the handy bottle is provided on both sides of the body portion 3 with recessed portions for griping 6, which are encompassed each with a plane portion 7.

Figure 2:
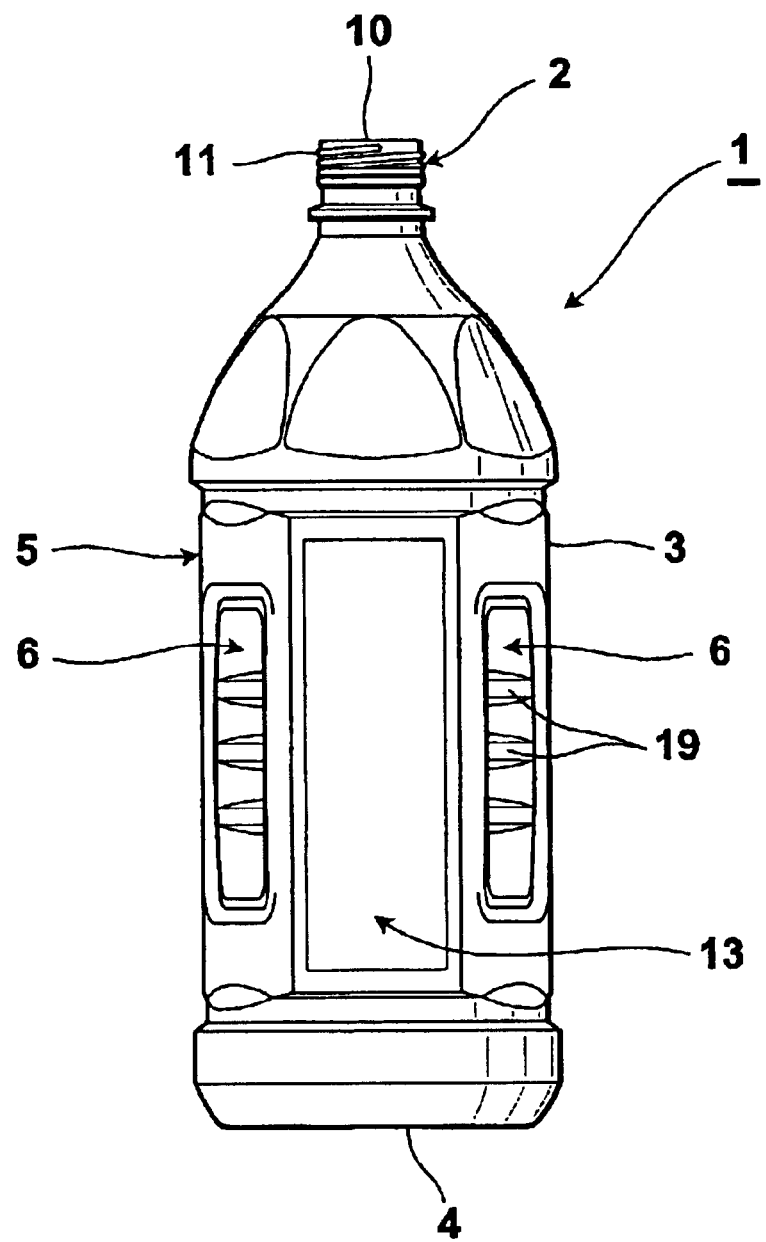
FIG. 2 is a back view showing the handy bottle of FIG. 1.
Figure 3:
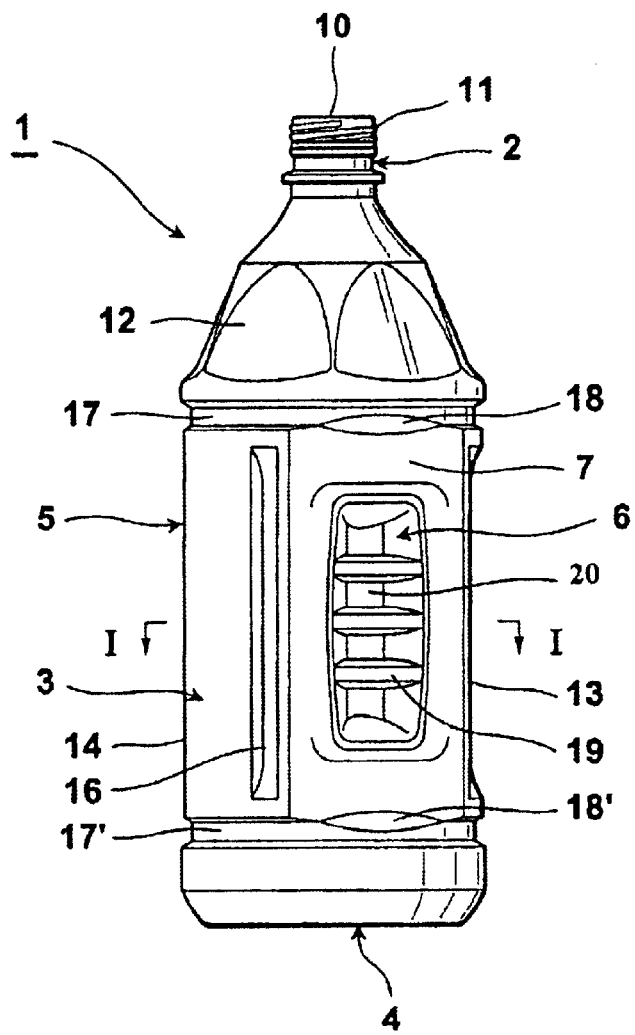
FIG. 3 is a side view showing the handy bottle of FIG. 1.
Figure 4:
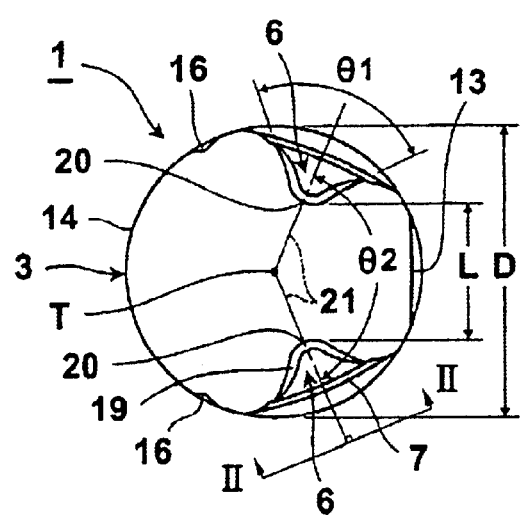
FIG. 4 is a sectional view showing the handy bottle of FIG. 3 cut along the line I—I.
Figure 5:
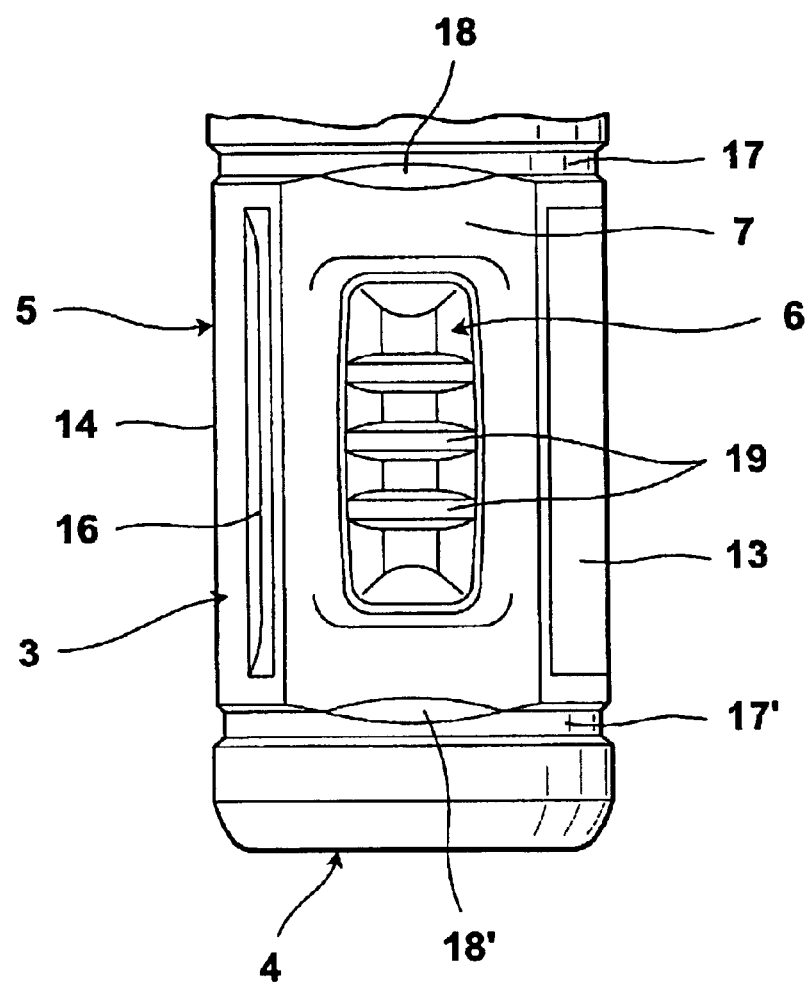
FIG. 5 is a side view showing the handy bottle of FIG. 4 viewed from the line II—II.
Figure 6:
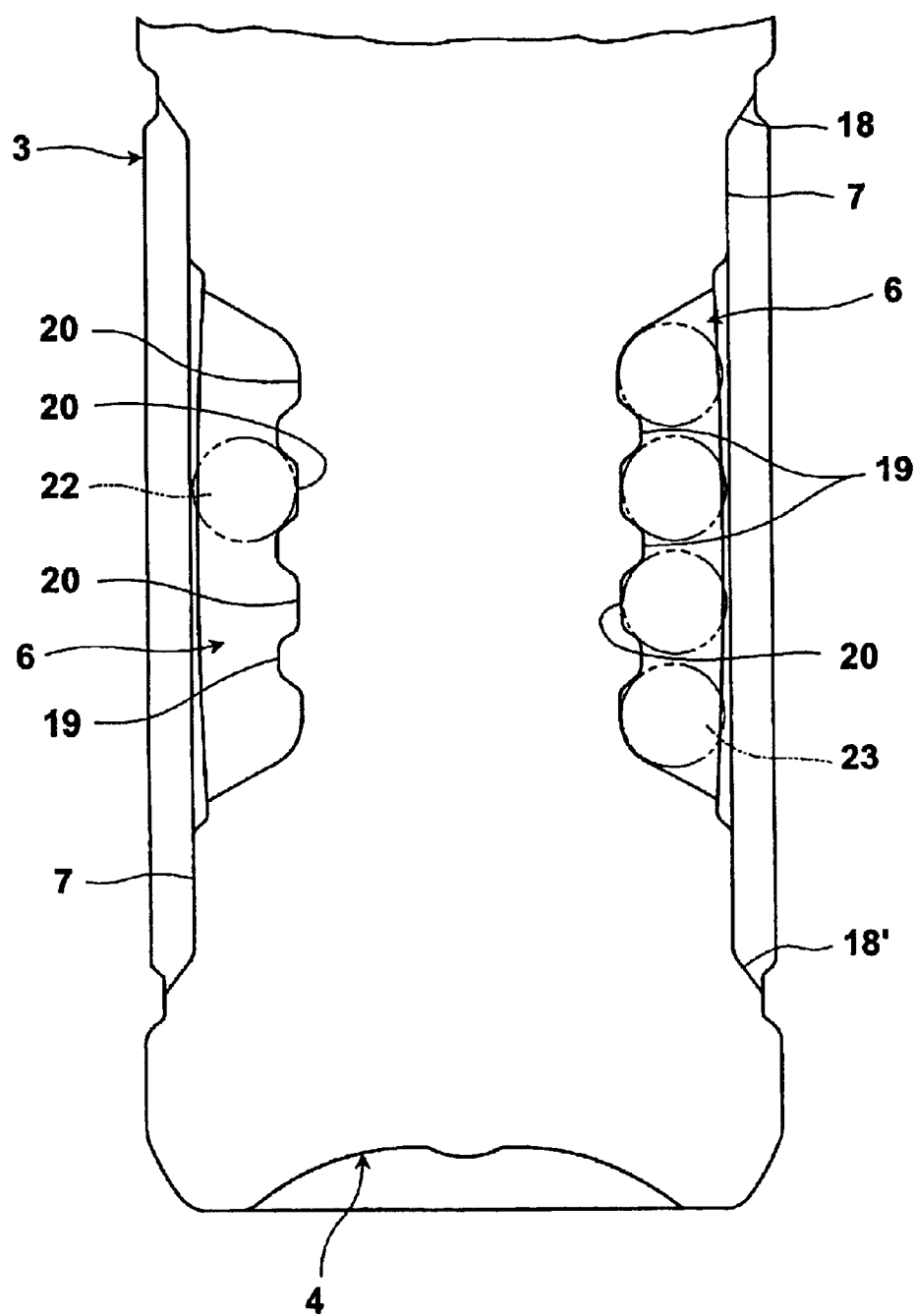
FIG. 6 is a longitudinal sectional view showing the handy bottle of the present invention on use.

In FIG. 2 et seq., the same notations are commonly used for brevity in order to indicate the same parts. FIG. 2 is a back view of the handy bottle of FIG. 1, while FIG. 3 is a side view of the handy bottle of FIG. 1. FIG. 4 is a sectional view of the handy bottle of FIG. 3, while FIG. 5 is a side view of the handy bottle of FIG. 4. FIG. 6 is a longitudinally sectional view showing the handy bottle on use.

In these FIGS. 1~6, the main body 5 is cylindrical in shape and the mouth finish 2 is provided with a beak 10 and a screw portion 11 to which a bottle cap is fitted. In this example, the body portion 3 is circle in cross section in view of a problem of strength but may be a polygonal shape in cross section. The body portion 3 is provided on the upper part thereof with a shoulder portion panel 12 while the middle part thereof has the recessed portions for gripping 6 on both sides and a back surface panel 13 exists therebetween. The back surface panel 13 is provided on the opposite side with a labeling portion 14 onto which a label is attached. As shown in FIG. 6, the bottom portion 4 is upwardly recessed to form a protuberant angular peripheral portion to protect a gate portion and serves to enhance dropping strength of the bottle.

The body portion 3 of the main body 5 is provided in a middle part thereof with the recessed portions for gripping 6 on both sides and the recessed portions per se are in the form of a longitudinally concave rectangle as shown in FIG. 3. On the bottom of the concave rectangle, plural reinforcing ribs 19 are arranged at equal intervals and in a diametrical direction of the body portion 3. In an example shown in FIG. 3, three reinforcing ribs 19 are used. The recessed portions for gripping 6 thus constructed on both sides of the body portion 3 are surrounded with the plane portion 7 so that the recessed portion for gripping 6 and the plane portion 7 on both sides of the body portion 3 as a whole function as a panel, and this panel effect serves, in cooperation with the shoulder portion panel 12, the back surface panel 13 and the bottom portion 4, to absorb deformation strain caused by variation in capacity.

Accordingly, a considerably large variation in capacity which cannot hitherto be absorbed only by the shoulder portion panel 12, the back surface panel 13 and the bottom portion 4 can now be absorbed by additional cooperative panel effect brought about by the recessed portions for gripping 6 and the plane portion 7, so that any deformation such as recess in the labeling portion 14 would not take place.

What is more, the handy bottle 1 is provided in the body portion 3 positioned between the labeling portion 14 and the recessed portions for gripping 6 on both sides with at least a pair of vertical ribs 16 in an axial direction of the body portion 3 as shown in FIGS. 1~5, so that the vertical beads 16 function to absorb variation of capacity to deform the labeling portion 14 toward protuberant direction thereby preventing deformation of the labeling portion 14 toward recessing direction.

The handy bottle 1 is provided on the periphery of the upper and lower ends of the body portion 3 with lateral ribs 17 and 17' which are connected to the plane portion 7 encompassing the recessed portions for gripping 6 as obviously shown in FIGS. 1~3. A connecting portion between the plane portion 7 and the lateral ribs 17 and 17' are slant portions 18 and 18', respectively, as shown in FIG. 6. By virtue of the peripheral recessed lateral ribs, the body portion 3 connected to the shoulder portion of the bottle and to the bottom portion is scarcely deformed by power of gripping and reduced pressure.

As shown in FIG. 6, the body portion 3 is provided with the recessed portions for gripping 6 having three reinforcing lateral ribs 19 with the deepest portion 20 existing between the individual ribs. On either one side of the recessed portion 6, thumb is allowed to touch to any of the deepest portions 20 while the remaining fingers are allowed to touch to the deepest portion 20 on the other side of the recessed portion 6. The number of the reinforcing lateral ribs 19 is not limited to three and may be at least three. The handy bottle 1 can thus be grasped by a single hand whereby the above three reinforcing lateral ribs 19 serve to facilitate lifting up the handy bottle 1 by hand.

FIGS. 7~12 show different embodiments of the handy bottle for the sake of explaining the feature of the present invention.

Figure 7:
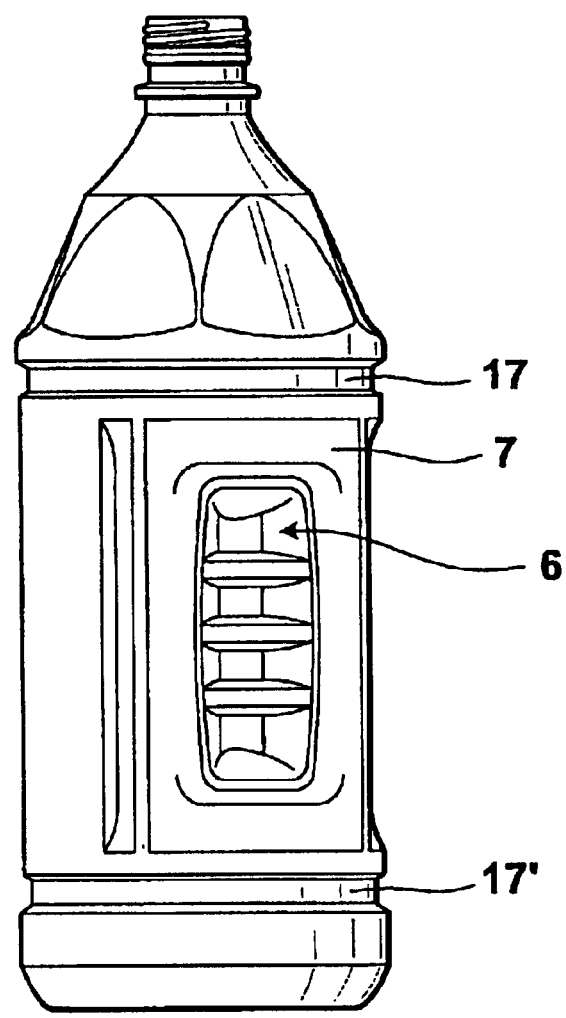
FIG. 7 is a side view showing another embodiment of the handy bottle of the present invention.
Figure 8:
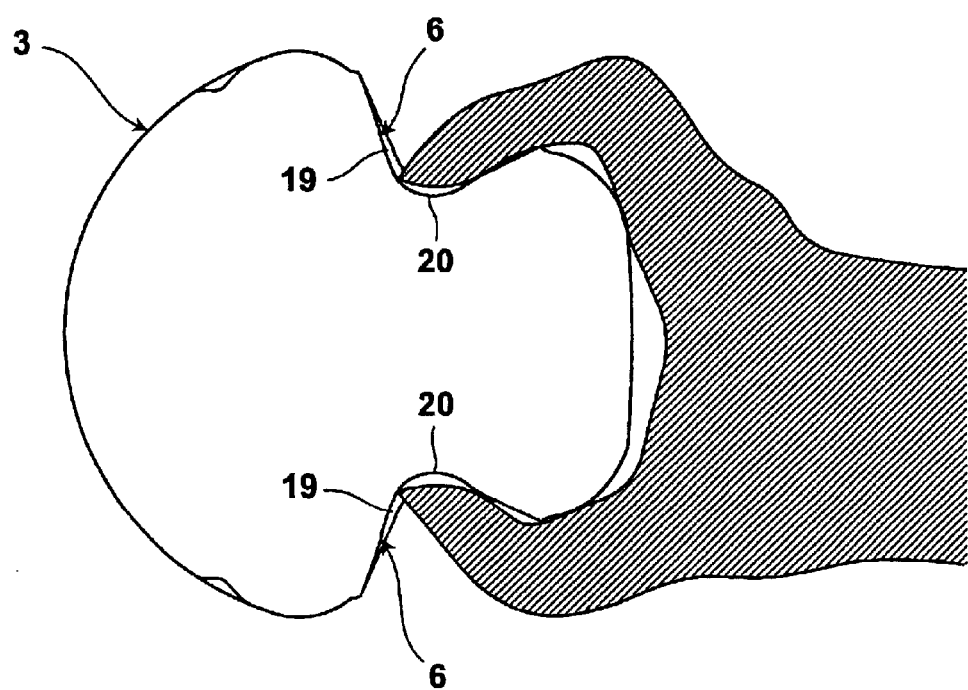
FIG. 8 is a laterally sectional view showing an example of the handy bottle of the present invention on use.

The lateral ribs 17 and 17' are not necessarily connected directly to the plane portion 7 and may be adjacent with a little interval as shown in FIG. 7. Further, the handy bottle may be provided with the lateral rib on either upper or lower side only.

As shown in FIG. 4, a minimum distance (L) between the deepest portions 20 on both sides of the recessed portions for gripping 6 is set as 50% or less of the diameter (D) of the drum portion, i.e. $L/D \leq 50\%$, to facilitate lifting up the body portion 3 by hand. Further, the shape of the recessed portions for gripping 6 in diametrical cross section almost bilaterally symmetrical to the deepest portion 20 as the center, i.e. the straight line 21 passing through the axial center T of the body portion 3 and the deepest portion 20 as the center. As the result, deviation in thickness of a resin and whitening due to super-stretching hardly take place in the course of molding the handy bottle, and deformation also hardly takes place during the manufacture of the bottle, especially at the time of checking any pinhole and at the time of gripping or under reduced pressure.

By the term "almost bilaterally symmetrical" is meant herein the state of almost bilaterally symmetrical (involving the state of perfect symmetry as a matter of course) to the deepest portion 20 as the center; more precisely, the state of almost bilaterally symmetrical to the straight line 21 passing through the axial center T of the body portion 3 and the deepest portion 20 as the center, and a difference in the length in bilateral direction being 10% or less, preferably 5% or less.

In addition, an angle $\theta 1$ of the recessed portions for griping 6 in diametric cross section is within the range from 0° to 90°, i.e. $0° \leq \theta 1 \leq 90°$, as shown FIG. 4. If the angle $\theta 1$ is less than 0° (i.e. $\theta 1 < 0°$), opening of the metal mold will not be made so that blow molding is difficult to perform. On the other hand, if the angle $\theta 1$ exceeds 90° (i.e. $\theta > 90°$), fingers will hardly touch between the recessed portions for gripping 6, thus making it difficult to lift up the bottle by hand. A preferable range of the angle $\theta 1$ is from 50° to 90°, i.e. $50° \leq \theta 1 \leq 90°$. By limiting the angle $\theta 1$ to this range, blow molding of the bottle becomes extremely easy and touch of fingers is smooth and sufficient for lifting up the bottle. By the way, a concrete shape of the recessed portions for gripping 6 is U-letter shape.

The angle $\theta 2$ formed by the straight lines 21, 21 passing through the deepest portion 20 in diametric cross section of the recessed portions for gripping 6 and the axial center T of the body portion 3 is within the range from 120° to 180°, i.e. $120° \leq \theta 2 \leq 180°$. As the result, it becomes easy to hold the body portion 3 by fingers and palm of hand. If the angle $\theta 2$ is smaller then 120° (i.e. $\theta 2 < 120°$), finger will hardly touch between the recessed portion for gripping 6 to make it difficult to hold the bottle with hand. On the other hand, if the angle $\theta 2$ exceeds 180°, (i.e. $\theta 2 > 180°$), too much fingers will touch between the recessed portions for gripping 6 to make it adversely difficult to hold the bottle by hand.

The reinforcing ribs 19 mounted to the recessed portions for gripping 6 have a height of 3~6 mm from the bottom of the concave portion and a pitch of 20~25 mm in examples shown in the drawings. The three reinforcing ribs 19 in the recessed portion for gripping 6 are necessary for improving anti-buckling strength, and in fact the buckling phenomenon would scarcely take place.

Figure 13:
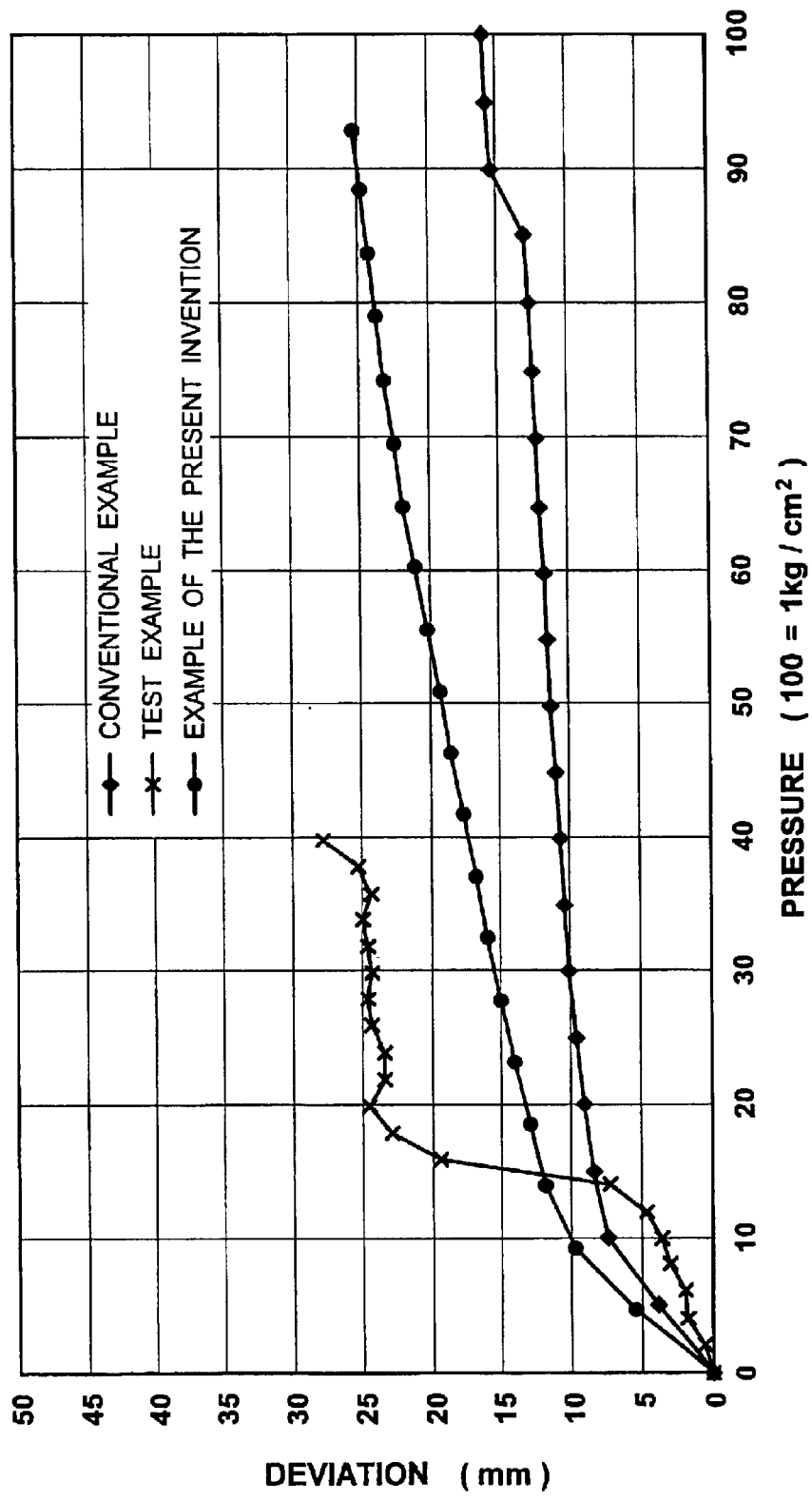
FIG. 13 is a graph showing the relation between pressure and deviation in a pinhole check of handy bottles.

FIG. 13 is a graph showing the result of a computer simulation by way of the finite elemental method to check deviation (maximum deviation) in shape of the handy bottles devoid of the ribs in case of increasing inner pressure of the bottles.

In FIG. 13, the notation ● stands for results of a test carried out for an embodiment of the bottle of the present invention shown in FIG. 2. The notation × stands for results of a test carried out for a trial example of a handy bottle which is similar in shape to the bottle of the present invention with the exception that the bottle of the trial example have three thin ribs and its shape in diametric cross section is bilaterally asymmetrical to a straight line connecting the deepest portion and an axial center of the bottle.

The notation ♦ stands for results of a test carried out in a similar manner for a conventional handy bottle shown in FIGS. 19 and 20. As is evident from FIG. 13, the bottle of the present invention (the notation ●) is smooth in a curve for deviation over a wide pressure range and shows that deformation caused by buckling hardly takes place, as compared with the results of the trial example (the notation ×) and the conventional bottle where the shape of the recessed portion for gripping in cross sections is bilaterally asymmetrical to the axial center.

Figure 9:
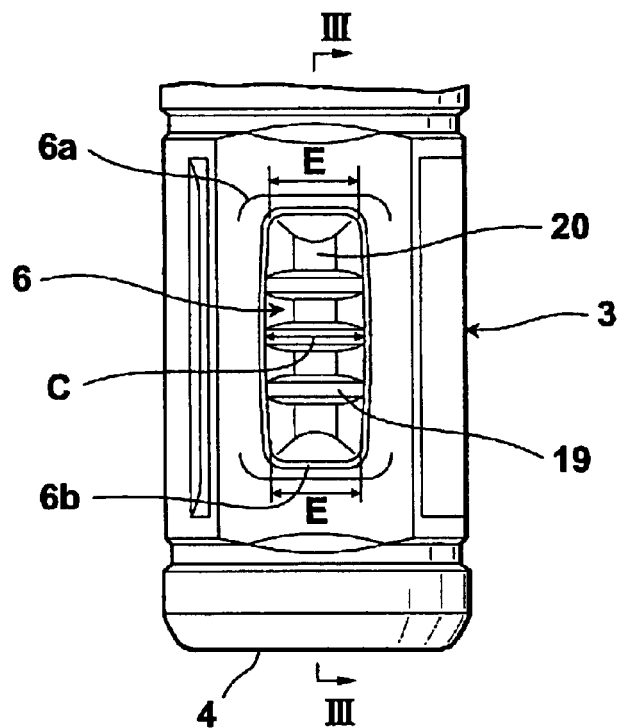
FIG. 9 is a side view showing another embodiment of the handy bottle shown in FIG. 4 of the present invention viewed from the line II—II.

The shape of both ends 6a and 6b of the recessed portions for gripping 6 in axial direction thereof is horizontal as shown in FIG. 9. The handy bottle thus constructed serves to disperse power capable of causing deformation due to the buckling phenomenon initiated by a slight deformation of both ends 6a and 6b of the bottle, thereby exhibiting a technical effect of preventing such slight deformation.

Figure 14:
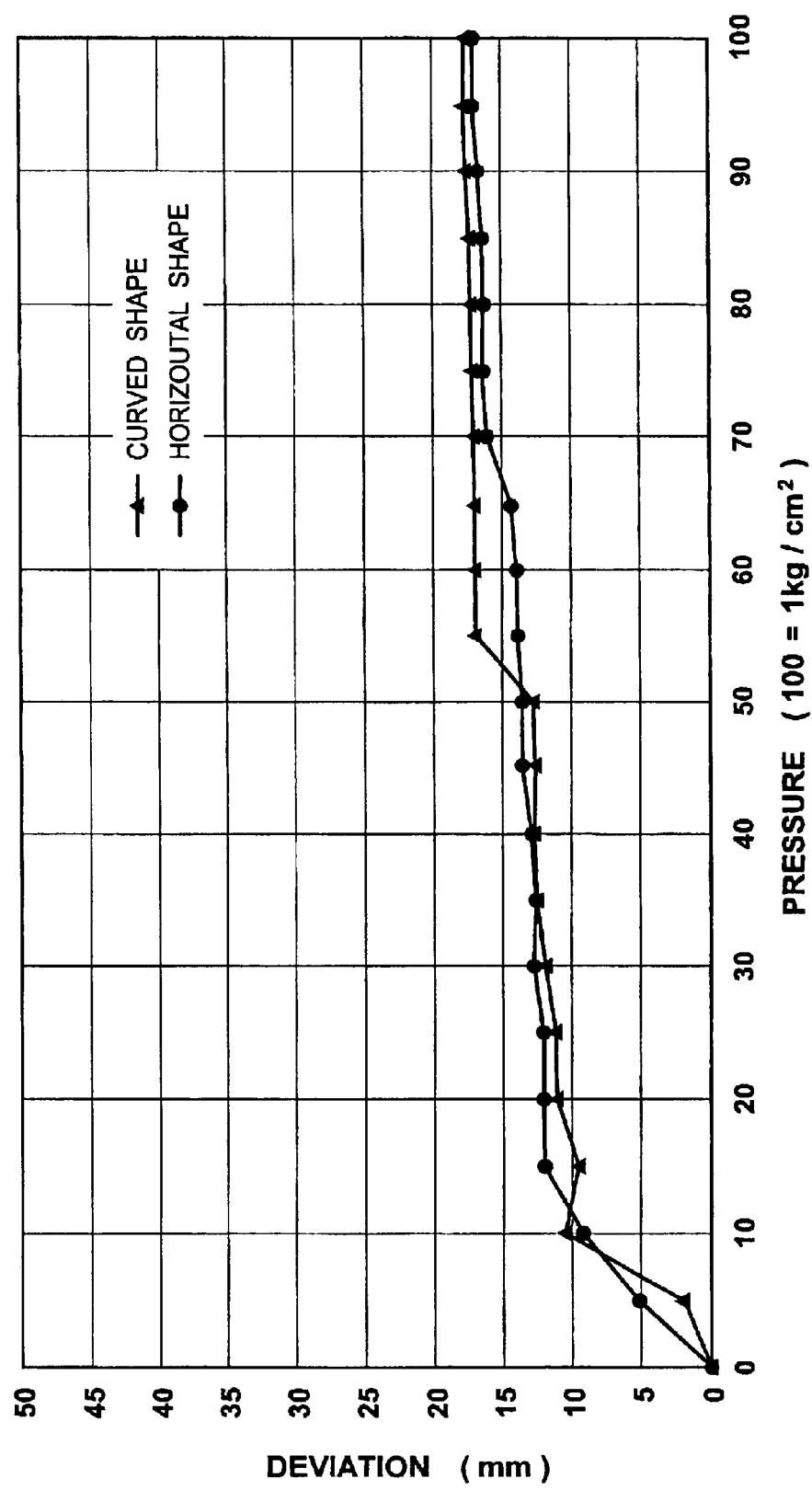
FIG. 14 is another graph showing the relation between pressure and deviation in a pinhole check of handy bottles.

FIG. 14 shows result of analyses by way of computer simulation on the amount of deviation (a maximum deviation) in shape of bottles having the same recessed portion for gripping but being different in the shape of both terminal ends; a lateral shape (the notation ●) and a curved shape (the notation ▲), in case of increasing the inner pressure of the bottles. In view of the results shown in FIG. 13, it is understood that the bottle of a lateral shape shows a deviation curve, especially at the initial stage of pressurization is smooth as compared with the case of the curved shape, thus making it manifest that a slight deformation at the initial stage of pressurization hardly takes place.

In the handy bottle showing an embodiment of the present invention, the length of the recessed portions for gripping 6 in the diametric direction is, as shown in FIG. 9, longer in the central portion C than in both end portions E (C>E). The reason why the central portion C of the recessed portion for gripping 6 is longer than both ends E thereof is that the central portion C is more removable and its removal absorbs the power of causing buckling phenomenon lest it should take place.

Figure 10:
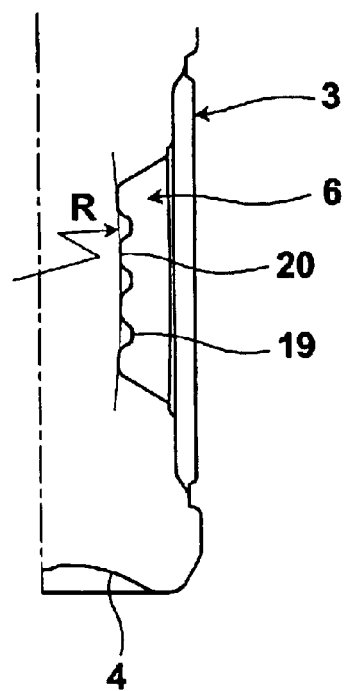
FIG. 10 is a half-cut sectional view showing the handy bottle of FIG. 9 cut along the line III—III.

The shape of the recessed portion for gripping 6 in axial cross section is formed to be protuberant outwardly, as shown in FIG. 10. As the bottom portion of the recessed portion for gripping 6 is outwardly protuberant in curvature (R), therefore, the amount of deformation at the time of pressurization can be decreased.

Next, a process for producing a handy bottle of the present invention will be explained, taking a handy bottle of the shape shown in FIG. 18 as an example.

Figure 15:
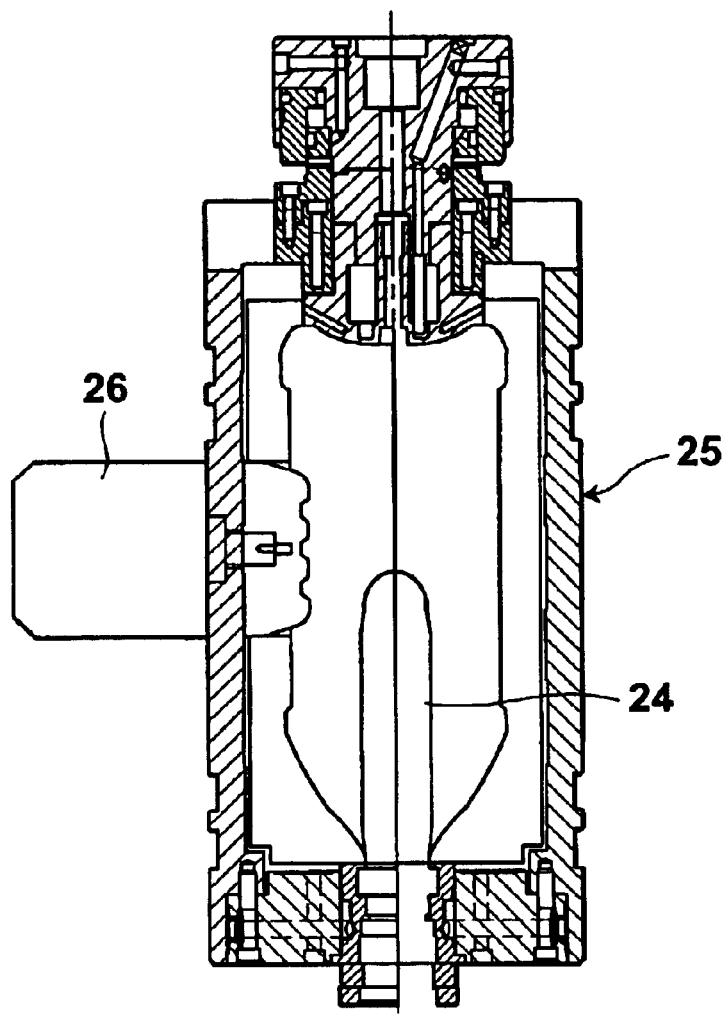
FIG. 15 is a sectional view showing an example of the metal mold for blow molding of the handy bottle of the present invention.
Figure 16:
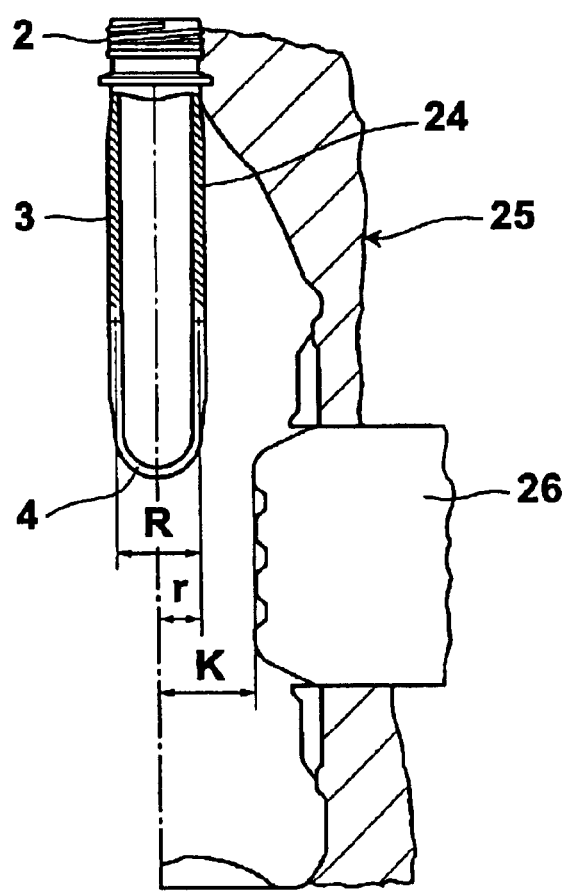
FIG. 16 is a partially cut out sectional view showing an example of the metal mold for blow molding of the handy bottle of the present invention.

At the outset, a preform 24 which can form, after molding, a handy bottle 1, a mouth finish 2, a body portion 3 and a bottom portion 4 is produced according to a method different from a blow molding method. As shown in FIGS. 15 and 16, the preform 24 is charged into a metal mold 25 for blow molding, which is composed of a movable inserts 26 capable of forming the recessed portions for gripping 6 on both sides of the mold (only one side is shown in FIGS. 15 and 16), a stretch rod capable of charging the preform 24 into the mold from an inlet portion of the metal mold, and a press rod capable of approaching the bottom of the preform 24 from the outside of the mold (both rods are not shown). The stretch rod is inserted into the preform 24 charged into the metal mold 25 and heated for softening, while the press rod is brought to approach to the bottom portion of the preform 24 from the outside of the metal mold. The preform 24 is thus interposed between the stretch rod and the press rod and stretched by cooperation of the two rods. Air is blown into the mold simultaneously with stretching or on the way of stretching to mold a handy bottle 1.

Figure 17:
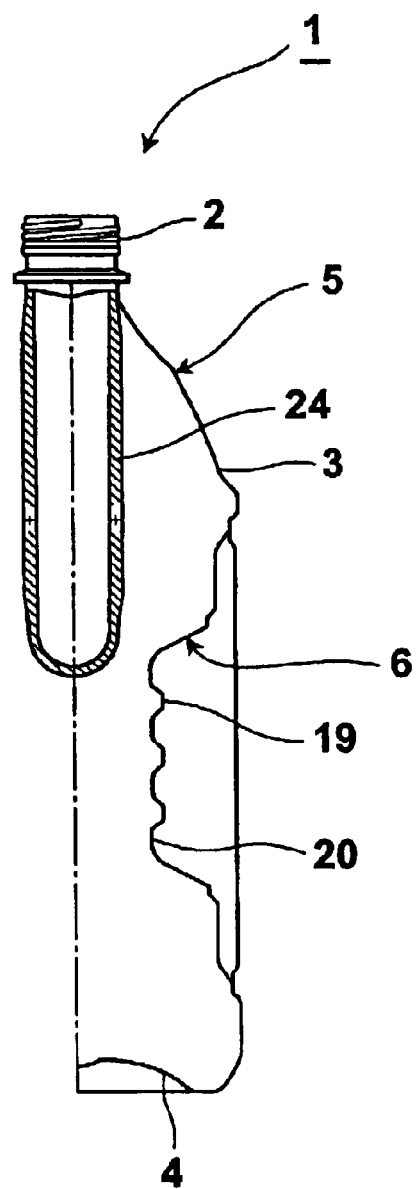
FIG. 17 is a half cut sectional view showing the process for producing the handy bottle of the present invention.

In this case, the movable inserts 26 capable of forming the recessed portion for gripping 6 is beforehand allowed to be on standby in a position at 2.0~2.6 times ½ of the central diameter (R) of the preform 24 [½R×(2.0~2.6)], i.e. the position at a ratio of the central radius of the preform 24 from the center line depicted by a chain line (R/2=r) to the distance k to the front end of the movable insert 26 (k/r) being 2.0~2.6 as shown in FIG. 16. Blow molding is then initiated and the movable insert 26 is allowed to proceed to the deepest portion 20 of the recessed portion for gripping 6 when the proceeding of blow molding reached to 60% (±3%) of the capacity of the handy bottle 1 or 60% of the capacity of the metal mold 25 for blow molding, thereby obtaining the handy bottle 1 as shown in FIG. 17.

The timing of allowing the movable inserts 26 to work from the standby position may be such that the rods for stretch consisting of a stretching rod and a press rod reaches to 80% (±4%) of the total moving distance. The result obtained is identical with the above. In the above process for producing a handy bottle, the weight of the bottom portion 4 in the main body 5 is reduced by 12~14.5% from the weight of the bottom portion in the main body obtained by molding the preform in such manner that the movable inserts 26 capable of forming the recessed portions for gripping 6 are previously allowed in the metal mold 25 to be on standby in a location exceeding 2.6 times of the central diameter (R) of the preform 24 and then blow molding is effected, thereby reducing the weight of the handy bottle 1.

No particular limitation exists in materials for constituting the handy bottle 1 of the present invention. In general, however, polyethylene, polypropylene, polyethylene terephthalate, copolymerized polyesters, etc. can be adopted. No particular limitation also exists in capacity of this handy bottle. Practically, the effect of this invention will be exhibited in a big size handy bottle of 1.8 liters, 2.7 litters, 4 liters, etc. in capacity. A popular liquid, solid and semi-solid material such as an alcohol-containing drink, any kind of beverage, an edible oil, and various kinds of seasoning and flavoring, such as soy source and vinegar; a fuel, a machine oil, an emulsion, a liquid drug, etc. can be mentioned as contents of the handy bottle.

EXAMPLES

The present invention and its effectiveness will now be illustrated in more detail by way of Examples and Comparative Examples. However, the present invention is not limited to these Examples.

Example 1

Using handy bottles made of polyethylene terephthalate having a capacity of 2.7 liters and various shapes as shown in FIGS. 1~6, specific properties of (1) absorbability under reduced pressure and (2) evaluation of actual liquid pack are measured and evaluated according to the following methods:

(1) Absorbability Under Reduced Pressure:

A bottle to be tested was filled fully with water, and provided with a rubber stopper on the mouth finish thereof. A needle of a syringe was pierced into the rubber stopper, and water in the bottle was taken out by the syringe to keep the bottle under reduced pressure. The degree of reduced pressure was increased to form a recess on the drum portion (labeling portion) whereby a jumped deformation was generated and the degree of reduced pressure (in terms of ml) at that time was measured.

(2) Evaluation of Actual Liquid Pack:

A bottle made of a synthetic resin to be tested was filled with whiskey having an alcohol concentration of 40° and then was cooled down to 5° C. The state of any deformation of the bottle was visually checked. On evaluation, a test sample where no deformation was observed was marked as ○, while a test sample where definite deformation was observed was marked as ×.

Example 2

Using a handy bottle made of polyethylene terephthalate having a capacity of 2.7 liters and a shape as shown in FIG. 7 as another embodiment of the present invention, the same measurement as described in Example 1 was performed.

Comparative Example 1

Using handy bottles made of the same resinous material as in Example 1 having a capacity of 2.7 liters and shapes as show in FIGS. 19 and 20, specific properties of (1) absorbability under reduced pressure and (2) evaluation of actual liquid pack was measured and evaluated in the same manner as described in Example 1.

Results of the measurements and evaluation obtained in Examples 1 and 2 and in Comparative Example 1 are shown in Table 1.

TABLE 1

|  | Absorbability under reduced pressure (ml) | Evaluation of actual liquid pack (alcohol concentration 40°; filled at 40° C. → 5° C.) |
| --- | --- | --- |
| Example 1 | −75 | ○ |
| Example 2 | −65 | ○ |
| Comparative Example 1 | −40 | × (concave deformation) |

In view of Table 1, the handy bottles of Examples 1 and 2 made of polyethylene terephthalate are excellent in absorbability under reduced pressure (ml) and in evaluation of actual liquid pack as compared with Comparative Example 1, thus making the effect of the present invention obvious.

Example 3

Using a bottle made of polyethylene terephthalate having a capacity of 2.7 liters and a shape as shown in FIG. 2, measurements were carried out with respect to the following items:

(1) Dropping strength for filled bottle alone
(2) Pressure for checking anti-pinhole
(3) Easiness for gripping.

Concerning the item (3), evaluation was made functionally by a manual test.

<Method for Measuring the Physical Properties>

(1) Dropping Strength for Filled Bottle Alone:

A handy bottle filled with 2.7 liters of water and tightly sealed with a stopper was dropped from a height of 30 cm onto the surface of concrete whereby the impact state of the bottle made of the synthetic resin was visually observed. Unless no particular influence was observed, the length was stepwise increased by 10 cm, and the height was measured when a relatively large influence such as occurrence of the buckling phenomenon or collapse of the bottle was visually observed. On evaluation, a height of 50 cm or higher was marked as ○, while a height of not more than 50 cm was marked as 33.

(2) Pressure for Checking Anti-pinhole:

Pressurized air was supplied to a vacant handy bottle so as to increase the inner pressure gradually, and the pressure of causing the buckling phenomenon was measured. On evaluation, a pressure of 0.5 kg/cm$^2$ or higher was marked as ○, while a pressure of not more than 0.5 kg/cm$^2$ was marked as ×.

(3) Easiness for Gripping:

Easiness for gripping was functionally evaluated on condition that the bottle was filled fully with water. On evaluation, the condition of easy griping was marked as ○, while the condition of difficult gripping was marked as ×.

Comparative Example 2

Figure 11:
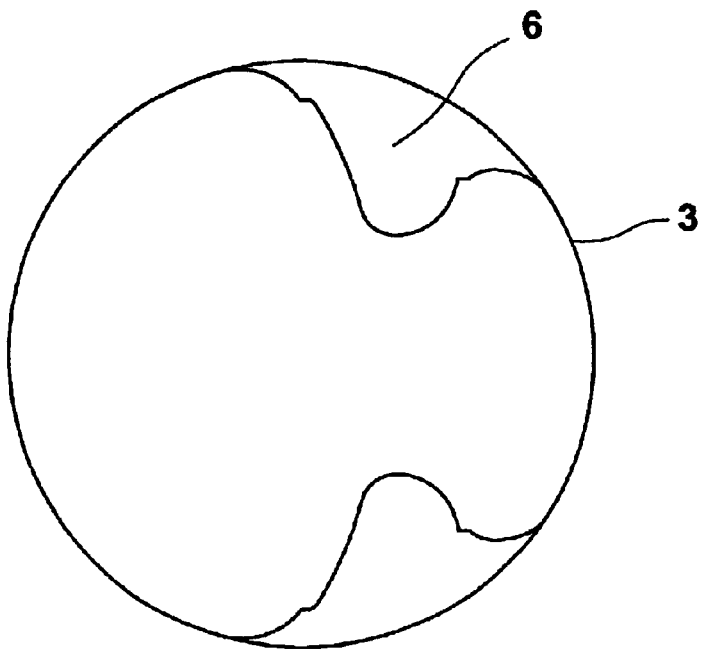
FIG. 11 is a sectional view showing a trial example of the handy bottle.
Figure 12:
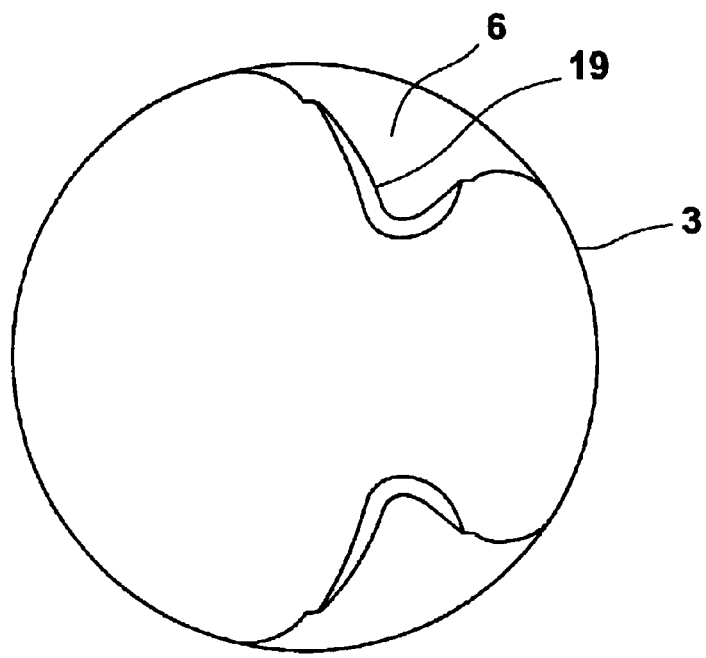
FIG. 12 is a sectional view showing another trial example of the handy bottle.

Using a handy bottle made of the same material as in Example 1 having a capacity of 2.7 liters and a shape as shown in FIG. 11 for a trial example, the measurement was carried out for the same items as in Example 1.

Results obtained in Example 3 and Comparative Examples 2 and 3 are shown in Table 2.

TABLE 2

|  | Dropping strength for filled bottle alone (cm) | Pressure for checking anti-pinhole (kg/cm$^2$) | Easiness for gripping |
|---|---|---|---|
| Example 3 | 90 ○ | 1.0 ○ | ○ |
| Comparative Example 2 | 90 ○ | 1.0 ○ | × |
| Comparative Example 3 | 30 × | 0.3 × | ○ |

In view of Table 2, the effect of the present invention is evident in that even in case of a big size bottle, it can gripped and lifted up safely since the handy bottle according to Example 3 is in fact deep in the recessed portion for gripping for aiming at easiness of holding, and shows a performance as handy bottle and no difference in physical properties as compared with Comparative Example 1 wherein the bottle is shallow in the recessed portions in gripping.

Example 4

Figure 18:
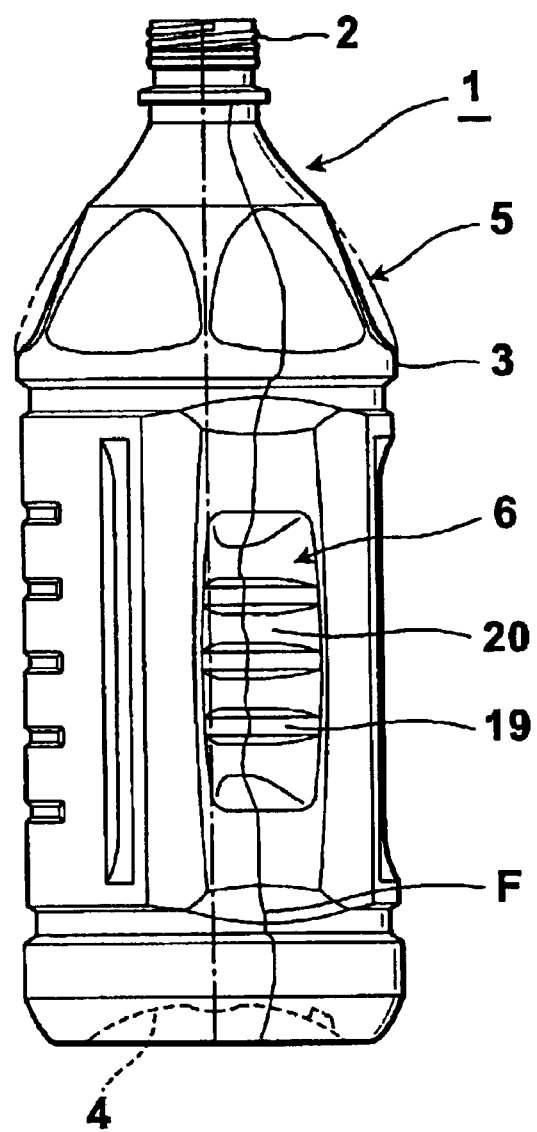
FIG. 18 is an explanatory drawing showing the measuring position for Examples of the process for producing handy bottles.
Figure 21:
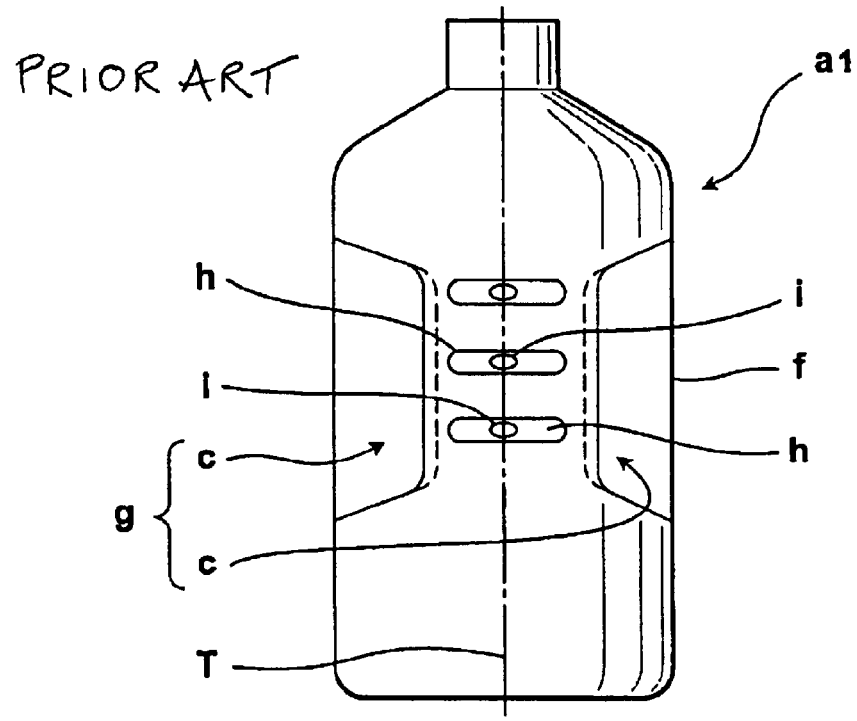
FIG. 21 is a side view showing another example of the conventional handy bottles.
Figure 22:
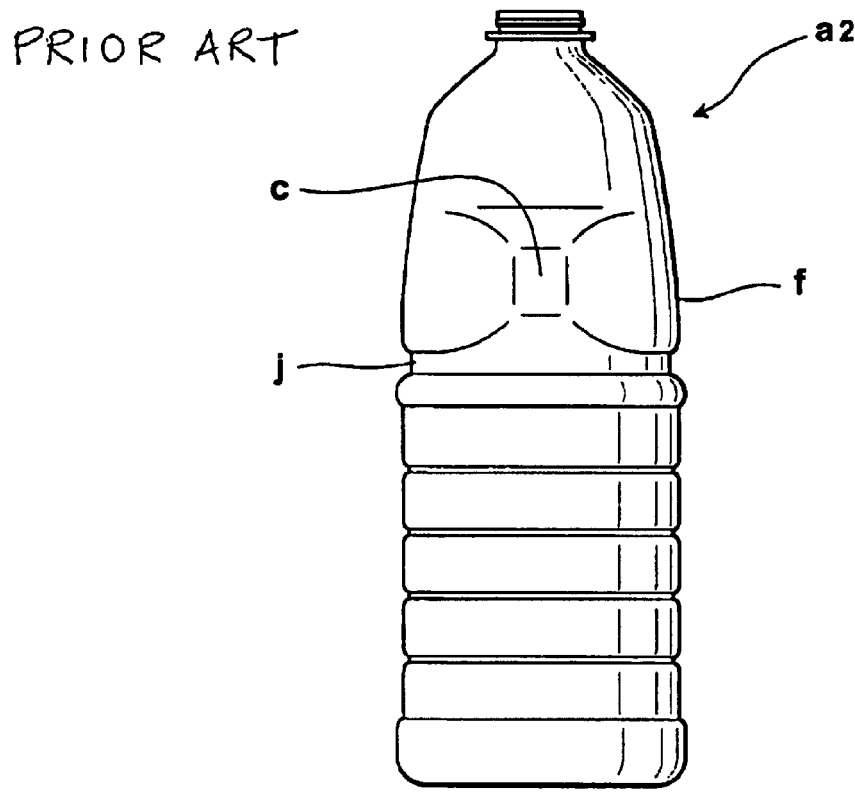
FIG. 22 is a side view showing still another example of the conventional handy bottles.
Figure 23:
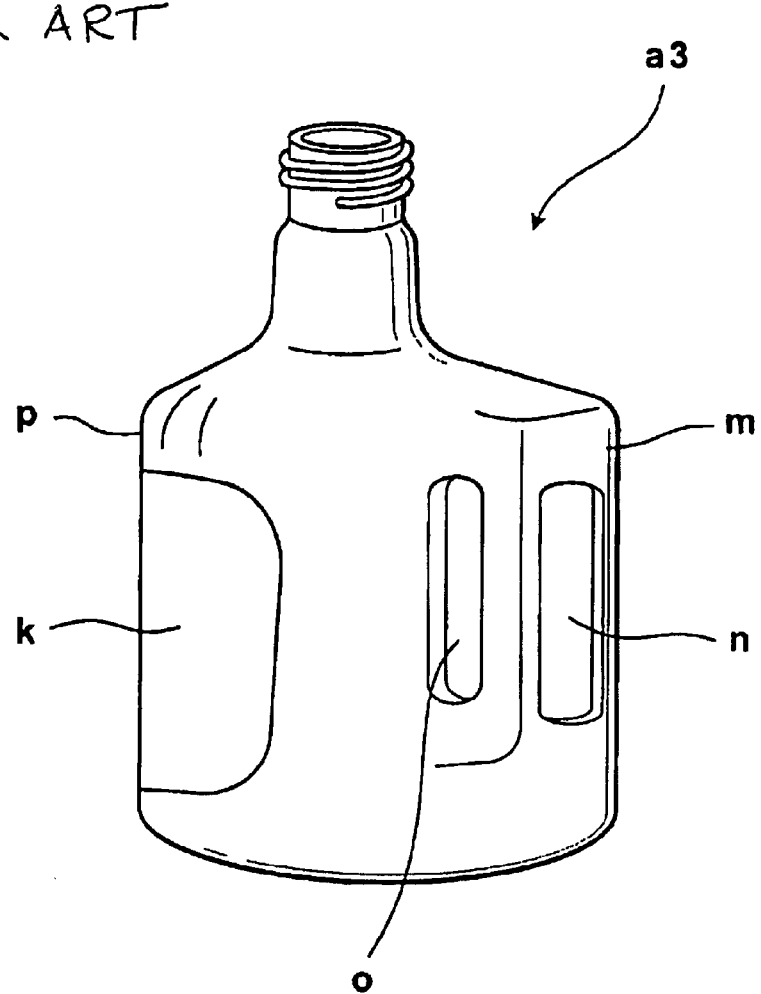
FIG. 23 is a side view showing still further example of the conventional handy bottles.
Figure 24:
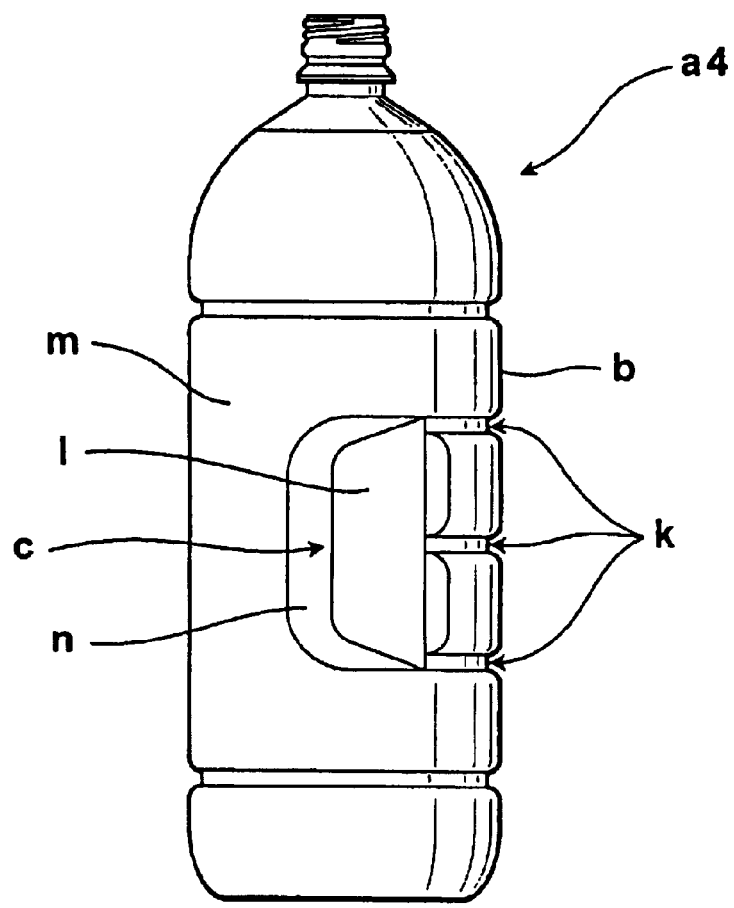
FIG. 24 is a side view showing yet further example of the conventional handy bottles.

Using a preform made of polyethylene terephthalate, which is to form a handy bottle having a shape as shown in FIG. 2 and a capacity of 2.7 liters, blow molding was carried out in such manner that movable inserts having a stroke (ST) of 7.5 (ST=7.5) were on standby in a position of 2.31 times ½ of a central diameter (R) of the preform in a mold for blow molding and were allowed to proceed toward the deepest portion of the recessed portions for gripping when proceeding of the blow molding reached to 60% of a capacity of the handy bottle, whereby the desired handy bottle was obtained. Concerning this handy bottle, distribution in thickness was measured for the following items:

(1) Concerning distribution in thickness of the recessed portions for gripping in vertical direction, thickness was measured in each position distant from the bottom portion along the line F as shown in FIG. 18.
(2) Concerning distribution in thickness of the recessed portions for gripping in lateral direction, thickness was measured in a position of 128.5 mm distant from the bottom portion along the line F as shown in FIG. 18.
(3) Concerning distribution of weight in each portion, individual portions of the distance from the bottom portion along the line F as shown in FIG. 18 were divided and the weight of each portion was measured.

Example 5

A handy bottle was produced in the same manner as illustrated in Example 4 except that the movable inserts having a stroke (ST) of 10 (ST=10) was on standby in a position of 2.31 times ½ of a central diameter (R) of the preform in a metal mold for blow molding. Regarding the resultant handy bottle, distribution in thickness was measured for the same items.

Comparative Example 4

A handy bottle was produced in the same manner as described in Example 4 except that the movable inserts having a stroke (ST) of 0 (ST=0) was on standby in a position of 1.99 times ½ of a central diameter (R) of the preform in a metal mold for blow molding. Regarding the resultant handy bottle, distribution in thickness was measured for the same items.

Comparative Example 5

A handy bottle was produced in the same manner as illustrated in Example 4 except that the movable inserts having a stroke (ST) of 0 (ST=0) was on standby in a position of 2.66 times ½ of a central diameter (R) of the preform in a metal mold for blow molding. Regarding the resultant handy bottle, distribution in thickness was measured for the same items.

Results obtained in Example 5 and Comparative Examples 4 and 5 are shown in Tables 3 and 4 below.

TABLE 3

|  | Example 4 | Example 5 | Comparative Example 4 | Comparative Example 5 |
|---|---|---|---|---|
| Inserts stroke | ST = 7.5 | ST = 10 | ST = 0 | ST = 0 |
| Position of Inserts on standby | 36 | 36 | 31 | 41.5 |
| Lateral stretch (x) | 2.31 | 2.31 | 1.98 | 2.66 |

TABLE 3-continued

| | Example 4 | Example 5 | Comparative Example 4 | Comparative Example 5 |
|---|---|---|---|---|
| of Inserts | | | | |
| Distribution of thickness in vertical direction of Recessed portions for gripping | | | | |
| 300 | 0.515 | 0.56 | 0.515 | 0.508 |
| 284 | 0.42 | 0.44 | 0.38 | 0.422 |
| Panel portion 255 | 0.43 | 0.43 | 0.403 | 0.419 |
| Shoulder portion 227 | 0.34 | 0.33 | 0.335 | 0.387 |
| Upper rib 217 | 0.38 | 0.38 | 0.395 | 0.447 |
| 200 | 0.44 | 0.45 | 0.441 | 0.438 |
| Recessed portion 128.5 | 0.431 | 0.443 | 0.445 | 0.52 |
| For gripping 57 | 0.56 | 0.54 | 0.499 | 0.467 |
| Lower rib 40 | 0.52 | 0.5 | 0.48 | 0.56 |
| Lower portion (max) 24 | 0.55 | 0.53 | 0.51 | 0.545 |
| Heal 8 | 0.7 | 0.68 | 0.69 | 0.683 |
| Bottom surface 0 | 0.65 | 0.62 | 0.56 | 0.668 |
| Distribution of thickness in lateral direction of Recessed portions for gripping | | | | |
| Labeling portion | 0.44 | 0.447 | 0.47 | 0.46 |
| Recessed portion (side) | 0.397 | 0.392 | 0.445 | 0.43 |
| Recessed portion 128.5 | 0.431 | 0.443 | 0.445 | 0.52 |
| Recessed portion (side) | 0.379 | 0.374 | 0.435 | 0.404 |
| Panel portion | 0.462 | 0.486 | 0.516 | 0.484 |

TABLE 4

Distribution of weight

| | Range of height (mm) | Example 4 | Example 5 | Comparative Example 4 | Comparative Example 5 |
|---|---|---|---|---|---|
| Shoulder portion | 217~342 | 29.4 | 30.1 | 29.8 | 29.3 |
| Upper body portion | 128.5~217 | 20 | 20.1 | 20.9 | 20.1 |
| Lower body portion | 40~128.5 | 21.4 | 21.5 | 22.9 | 21.2 |
| Heal portion | 0~40 | 15.2 | 14.6 | 14.5 | 14.2 |
| Bottom portion | 0 | 13.6 | 13.3 | 11.5 | 14.7 |
| Total | | 99.6 | 99.6 | 99.6 | 99.5 |

In view of Tables 3 and 4, it is understood that the handy bottle obtained in Examples 4 and 5 of the present invention are thin in the thickness of the bottom portion and are thus decreased in the weight, but the thickness in the heal portion becomes thick on the contrary so that the weight of the bottom portion can be decreased without damaging stiffness of the body portion. In contrast to this, the handy bottle of Comparative Example 4 is thin in the thickness of the bottom portion and the weight is decreased, but the thickness is too thin so that a problem is raised in strength of the bottom portion. The handy bottle of Comparative Example 6 is thick in the bottom portion and the weight is increased, but the heal potion is adversely thin and the weight thereof is also decreased so that it becomes impossible to decrease the weight of the bottom portion without deteriorating stiffness of the body portion.

[Effect of the Invention]

In accordance with the first embodiment of the present invention, the recessed portions for gripping on both sides of the body portion are encompassed by a plane portion so that the recessed portions for gripping and the plane portion as a whole act as a panel, and this panel effect serves to absorb deformation strain caused by variation in capacity. Even if variation in capacity takes place frequently, therefore, the recessed portions and the plane portion as a whole absorb deformation of the bottle so that a beautiful appearance of the bottle can be kept to prevent deterioration of commercial value of the bottle including the contents thereof.

In case the vertical ribs act to absorb variation in capacity, the labeling portion is deformed toward protuberant direction thereby preventing deformation of the labeling portion in recessed direction in addition to the above effect. Moreover, the recessed lateral ribs connected or adjacent to the plane portion encompassing the recessed portions for gripping and extending to the diametric direction act as reinforcement against deformation so that the shoulder portion, the body portion and the bottom portion hardly tend to deform on gripping or at the time of pressurization or reducing the pressure.

In accordance with the second embodiment of the present invention, the recessed portions for gripping have a deepest portion with sufficiently depth so that the bottle can be lifted up by hand. As a shape in diametric cross section of the recessed portions for griping is bilaterally symmetrical, deviation in thickness hardly takes place on molding and also deformation at the time of pressurization for checking any pinhole or at the time of reduced pressure caused by lifting up the bottle by hand. Consequently, the present invention achieves such effect that the handy bottle obtained is excellent in dropping strength, capable of preventing the buckling phenomenon, excellent in resistance to pressurization and reduction of pressure, and easy for lifting up and carrying because of sufficiently deep recessed portions for gripping, while maintaining moldability and lightweight property.

Further, the angle $\theta 1$ is within the range from 0° to 90°, while the angle $\theta 2$ is within the range from 120° to 180°. Thus, the bottle can easily be held by fingers and palm of hand. These ranges of angles make opening of the metal mold smooth so that superiority in moldability is more distinct.

The buckling phenomenon is initiated by a slight deformation in both ends of the recessed portions for gripping in axial direction thereof. By making the shape of the both ends horizontal, such slight deformation hardly takes place in both ends so that the effect of preventing the buckling phenomenon at an initial stage is also distinct.

The recessed portions for gripping are molded outwardly protuberant so that the amount of deformation is proportionally decreased at the time of pressurization. Further, the length in diametric direction of the recessed portions for gripping is longer in the central portion (C) than in the both end portions (E) so that the central portion (C) is more movable and its removal can absorbs the power of causing the buckling phenomenon. By virtue of the outwardly protuberant reinforcing ribs serve to enhance buckling-resistant strength lest the buckling phenomenon should take place. Further technical merit is that three protuberant reinforcing ribs are well fit for fingers to make the bottle easy to be held.

According to the process for producing the handy bottle of the present invention, the position of the movable inserts on standby can properly be determined while the timing of allowing the movable inserts to work when the proceeding of blow molding reaches to at least 30% but not more than 70% of the capacity of the bottle, with a view to varying distribution of thickness in vertical and lateral directions thereby making the bottom portion at least thin in thickness while preventing decrease in thickness of the heal portion just above the bottom portion. Distribution of thickness in vertical and lateral directions can thus be controlled while maintaining the moldability and lightweight property. Furthermore, the sufficiently deep recessed portions for griping enable easy holding of the bottle and excel in dropping strength, thus preventing the buckling phenomenon effectively.

It is to be construed that the present invention is not limited or restricted to the embodiments described hereinbefore and any modification, alteration and substitution can be made within the scope of the appended claims. Such variations are not to be regarded as a departure from the spirit and scope of the invention, and all such modifications as would be obvious to one skilled in the art are intended to be included within the scope of the following claims.

What is claimed is:

1. A handy bottle, comprising a bottle shaped structure made of a synthetic resin having a mouth finish, a body portion, and a bottom portion, the body portion including recessed portions for gripping provided on both sides thereof, the recessed portions on said both sides of the body portion being encompassed by a plane portion.

2. A handy bottle according to claim 1, wherein:
   a label portion is positioned opposite to a region of the body portion provided on said both sides thereof with the recessed portions for gripping; and
   another region of the body portion which is positioned between the label portion and the recessed portions for gripping on said both sides of the body portion is provided with vertical ribs in an axial direction of the body portion.

3. A handy bottle according to claim 1 or 2, further comprising recessed lateral ribs extending in a peripheral direction provided in connection or adjacent to at least one of an up side end and a down side end of the plane portion.

4. A handy bottle, comprising: a mouth finish, a body portion, and a bottom portion, the body portion including recessed portions for gripping provided on both sides thereof, a minimum distance (L) between a deepest portion of the recessed portions for gripping being 50% or less of the diameter (D) of the body portion (L/D$\leq$50%), a shape of a radial cross-section of each of the recessed portions being one of a generally V-shape and U-shape which is approximately bilaterally symmetrical to a straight line connecting the deepest portion and a central axis of the body portion, the handy bottle being formed in a manner including biaxial stretching, there being substantially no whitening from super-stretching in the recessed portions for gripping the handy bottle.

5. A handy bottle according to claim 4, wherein an angle ($\theta 1$) of the recessed portions for griping is within the range from 0° to 90° in diametric cross section (0$\leq\theta 1\leq$90°) and an other angle ($\theta 2$) formed by lines connecting the deepest portion in diametric cross section of the recessed portions for gripping and the central axis of the body portion is within the range from 120° to 180° (120°$\leq\theta 2\leq$180°).

6. A handy bottle according to claim 4 or 5, wherein a shape of the recessed portions for gripping on both ends thereof is defined by a boundary extending horizontally to an axial direction.

7. A handy bottle according to claim 4 or 5, wherein a shape of the recessed portions for gripping in cross section is outwardly protuberant in an axial direction.

8. A handy bottle according to claim 4 or 5, wherein a length of the recessed portions for gripping in a diametric direction is longer (C>E) in a central portion (C) than at both ends (E) thereof.

9. A handy bottle according to claim 4 or 5, wherein the recessed portions for gripping are provided with outwardly protuberant auxiliary ribs extending in a diametric direction thereof.

10. A handy bottle according to claim 9, wherein the auxiliary ribs are three ribs arranged in an axial direction of the bottle at given intervals.

11. A handy bottle, comprising a body portion, and a bottom portion, said body portion including recessed portions for gripping disposed on two sides thereof, a mass of a bottom portion of the bottle is 12–14.5% of a total mass of the handy bottle.

* * * * *